/ Patented June 15, 1943

UNITED STATES PATENT OFFICE 2,321,935

AMINO DIARYL DIALKYL CYCLOBUTANE

Philip T. Paul, Naugatuck, Conn., assignor to United States Rubber Company, New York, N. Y., a corporation of New Jersey No Drawing. Application April 30, 1941, Serial No. 391,143

5 Claims. (Cl. 260—576)

This invention relates to newly discovered chemicals which are represented by the probable general formula

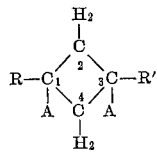

where R and R' are aryl groups, one of which is further substituted by an aryl-amino group; and A represents a saturated or unsaturated aliphatic radical such as methyl, ethyl, propyl, allyl, etc.

Exemplary of such compounds are:

1-(p-anilino phenyl) 3-phenyl 1,3 dimethyl cyclobutane
1-(o-anilino phenyl) 3-phenyl 1,3 dimethyl cyclobutane
1-(m-anilino phenyl) 3-phenyl 1,3 dimethyl cyclobutane
1-(p-beta naphthyl amino phenyl) 3-phenyl 1,3 dimethyl cyclobutane
1-(p-anisidino phenyl) 3-phenyl 1,3 dimethyl cyclobutane
1,3-di (p-anilino phenyl) 1,3 dimethyl cyclobutane
1-(anilino phenyl) 3-p-xenyl 1,3 dimethyl cyclobutane
1-(p-anilino phenyl) 3-p-tolyl 1,3 diethyl cyclobutane
1-(p-alpha naphthyl amino phenyl) 3-beta naphthyl 1,3 dipropyl cyclobutane
1-(p-anilino phenyl) 3-p-hydroxy phenyl 1,3 dimethyl cyclobutane
1-(p-anilino naphthyl) 3-phenyl 1,3 dimethyl cyclobutane
1-(p-anilino phenyl) 3-naphthyl 1,3 dibutyl cyclobutane
1-(p-toluidino phenyl) 3-phenyl 1,3 dimethyl cyclobutane.

The chemicals are generally viscous oils or resins and may be prepared by nitrating the corresponding 1,3 diaryl 1,3 dialkyl cyclobutane, reducing the nitro derivative, for example with zinc dust and ammonium chloride, and then either (a) acetylating and subsequently reacting with iodobenzene or homologue or analogue thereof, in alcoholic potassium hydroxide to remove the acetyl radical, to produce the desired cyclobutane,—or (b) directly fusing the reduced nitro derivative with a phenol to produce the desired cyclobutane. For preparation of the diaryl dialkyl cyclobutanes, see procedure in Beilstein, Vol. 5, page 652. The starting hydrocarbon is obtainable in the market.

The following examples are given to illustrate the preparation of the chemicals. The parts are by weight.

*Example 1*

1,3 diphenyl 1,3 dimethyl cyclobutane, 50 grams, is dissolved in 50 ccs. acetic acid and nitrated at 40–45° C. with a mixture of 28.6 cc. 70% HNO₃ and 28 cc. concentrated H₂SO₄. The reaction mixture is poured into water and the organic material extracted with benzene. The benzene extract is washed, dried and the benzene evaporated. The residue on vacuum fractionating gives two fractions.

I. B. R. 123–125° at 4 mm. mercury pressure— Unchanged hydrocarbon
II. B. R. 160–165° at 4 mm. mercury pressure— Nitro derivative Fraction II, on recrystallization from ligroin, gives 9 grams p-nitro 1,3 diphenyl 1,3 dimethyl cyclobutane, M. P. 178–180° C.

The nitro derivative (19.5 grams) is reduced with 20 grams zinc dust and 1 gram ammonium chloride in 150 ccs. 80% alcohol and 60 cc. dioxane. 1-(p-amino phenyl) 3-phenyl 1,3 dimethyl cyclobutane is obtained in a 72% yield, B. P. 160–165° at 3 mm. mercury pressure. Its acetyl derivative prepared by the action of acetic anhydride is not crystalline.

1-(p-acetamino phenyl) 3 phenyl 1,3-dimethyl cyclobutane (14.15 grams) is refluxed with 6.7 cc. iodobenzene and 8.5 grams potassium carbonate for 11 hours in 25 cc. methyl hexyl carbinol. After removal of the acetyl radical with alcoholic potassium hydroxide, the 1-(p-anilino phenyl) 3 phenyl 1,3 dimethyl cyclobutane is obtained as a viscous oil, B. P. 200–210° at 3 mm. mercury pressure. Yield 11 grams.

*Example 2*

1,3 diphenyl 1,3 dimethyl cyclobutane is nitrated and the whole nitration product is reduced with a large excess of zinc and ammonium chloride. The product is dissolved in benzene and shaken several times with 6 N hydrochloric acid to remove the amines. The acid extracts are neutralized and the mixed amines isolated. The mixture of amines (13.9 grams) consisting of 1-(o-amino phenyl) 3-phenyl 1,3 dimethyl cyclobutane, 1-(m-amino phenyl) 3-phenyl 1,3 dimethyl cyclobutane, and 1-(p-amino phenyl) 3-phenyl 1,3 dimethyl cyclobutane is fused with 8 grams beta naphthol and 2.5 grams potassium bisulfate for four hours at 190° C.

The product is dissolved in benzene and washed with dilute caustic, dilute acid and water. The residue after the removal of the benzene boils 250–360° at 3 mm. mercury pressure and consists of 1-(o-beta naphthyl amino phenyl) 1,3 dimethyl cyclobutane, 1-(m-beta naphthyl amino phenyl) 1,3 dimethyl cyclobutane, and 1-(p-beta naphthyl amino phenyl) 1,3 dimethyl cyclobutane, The chemicals may be used as chemical intermediates for the preparation of other materials or they may be used as such as anti-oxidants for preserving the deterioration of organic substances such as rubber and allied gums.

Having thus described my invention, what I claim and desire to protect by Letters Patent is:

1. A compound having the general formula

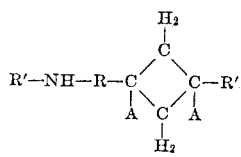

where R' represents an aryl group; R is an arylene group; and A is an alkyl radical.

2. 1-(arylamino aryl) 3-aryl 1,3 dialkyl cyclobutane.

3. A 1,3-diaryl 1,3-dialkyl cyclobutane in which one of the aryl groups is directly connected in the para position, to the secondary amino nitrogen atom of the group—NH—R where R is an aryl radical.

4. 1-(p-anilino phenyl) 3-phenyl 1,3 dialkyl cyclobutane.

5. 1-(p-beta naphthyl amino phenyl) 3-phenyl 1,3 dialkyl cyclobutane.

PHILIP T. PAUL.